(12) United States Patent
Muratov (10) Patent No.: US 11,496,000 B2
(45) Date of Patent: Nov. 8, 2022

(54) DETECTING FOREIGN OBJECTS IN WIRELESS POWER TRANSFER SYSTEMS

(71) Applicant: MEDIATEK Singapore Pte. Ltd., Singapore (SG)

(72) Inventor: Vladimir Alexander Muratov, San Jose, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/150,639

(22) Filed: Jan. 15, 2021

(65) Prior Publication Data

US 2021/0210990 A1 Jul. 8, 2021

Related U.S. Application Data

(63) Continuation of application No. PCT/CN2019/096863, filed on Jul. 19, 2019.

(60) Provisional application No. 62/700,371, filed on Jul. 19, 2018.

(51) Int. Cl.
*H02J 50/60* (2016.01)
*H02J 50/12* (2016.01)

(52) U.S. Cl.
CPC .............. *H02J 50/60* (2016.02); *H02J 50/12* (2016.02)

(58) Field of Classification Search
CPC .................................. H02J 50/60; H02J 50/12
See application file for complete search history.

(56) References Cited

U.S. PATENT DOCUMENTS

| 9,057,753 | B2 | 6/2015 | Nakano et al. |
| 9,178,361 | B2 | 11/2015 | Liu et al. |
| 9,294,153 | B2 | 3/2016 | Muratov et al. |
| 9,360,456 | B2 | 6/2016 | Miyamoto |
| 9,806,769 | B2 | 10/2017 | Nakano et al. |
| 10,199,881 | B2 | 2/2019 | Muratov et al. |
| 10,530,196 | B2 | 1/2020 | Oettinger et al. |
| 10,581,281 | B2 | 3/2020 | Muratov |
| 10,868,446 | B2 | 12/2020 | Muratov et al. |
| 10,916,972 | B2 | 2/2021 | Muratov et al. |
| 10,916,973 | B2 * | 2/2021 | Park .......................... H02J 7/02 |
| 11,038,382 | B2 * | 6/2021 | Park .......................... G01V 3/10 |
| 2008/0025055 | A1 | 1/2008 | Miyazaki et al. |

(Continued)

FOREIGN PATENT DOCUMENTS

| CN | 105474511 A | 4/2016 |
| CN | 106463973 A | 2/2017 |

(Continued)

OTHER PUBLICATIONS

International Search Report and Written Opinion for International Application No. PCT/CN2019/096863 dated Oct. 17, 2019.

(Continued)

*Primary Examiner* — Daniel Kessie
*Assistant Examiner* — Brian K Baxter
(74) *Attorney, Agent, or Firm* — Wolf, Greenfield & Sacks, P.C.

(57) ABSTRACT

Foreign object detection for a wireless power transmitter can be performed using a reference Q-factor and measured Q-factor. The reference and measured Q-factors are compared to determine where a foreign object is present. The comparison is adjusted based on one or more additional parameters.

29 Claims, 6 Drawing Sheets

(56) References Cited

U.S. PATENT DOCUMENTS

| | | |
|---|---|---|
| 2010/0001847 A1 | 1/2010 | Takaishi et al. |
| 2011/0196544 A1 | 8/2011 | Baarman et al. |
| 2012/0147802 A1 | 6/2012 | Ukita et al. |
| 2012/0161538 A1 | 6/2012 | Kinoshita et al. |
| 2012/0326660 A1 | 12/2012 | Lu et al. |
| 2013/0241302 A1 | 9/2013 | Miyamoto et al. |
| 2014/0077617 A1 | 3/2014 | Nakano et al. |
| 2014/0084857 A1 | 3/2014 | Liu et al. |
| 2014/0111019 A1 | 4/2014 | Roy et al. |
| 2014/0191715 A1 | 7/2014 | Wechlin et al. |
| 2014/0327393 A1 | 11/2014 | Lee et al. |
| 2015/0028875 A1 | 1/2015 | Irie et al. |
| 2015/0073768 A1 | 3/2015 | Kurs et al. |
| 2015/0155095 A1 | 6/2015 | Wu et al. |
| 2015/0285926 A1 | 10/2015 | Oettinger |
| 2015/0309126 A1 | 10/2015 | Jung et al. |
| 2015/0323694 A1 | 11/2015 | Roy et al. |
| 2015/0331135 A1 | 11/2015 | Widmer |
| 2016/0141889 A1 | 5/2016 | Choudhary et al. |
| 2017/0047777 A1 | 2/2017 | Nakano et al. |
| 2017/0117755 A1 | 4/2017 | Muratov et al. |
| 2017/0117756 A1 | 4/2017 | Muratov |
| 2017/0149287 A1 | 5/2017 | Nakano et al. |
| 2017/0163101 A1 | 6/2017 | Muratov |
| 2017/0187238 A1 | 6/2017 | Chong et al. |
| 2017/0229926 A1 | 8/2017 | Oettinger et al. |
| 2017/0310166 A1 | 10/2017 | Huang et al. |
| 2018/0115197 A1 | 4/2018 | Li et al. |
| 2018/0241257 A1 | 8/2018 | Muratov et al. |
| 2018/0342898 A1 | 11/2018 | Ikefuji |
| 2019/0131826 A1 | 5/2019 | Park et al. |
| 2019/0199142 A1 | 6/2019 | Muratov et al. |
| 2020/0259373 A1* | 8/2020 | Park ................. H02J 50/40 |
| 2020/0328625 A1* | 10/2020 | Mills ................. H04B 5/0043 |
| 2021/0057939 A1* | 2/2021 | Muratov ............. H02J 50/12 |
| 2021/0135506 A1 | 5/2021 | Muratov |
| 2021/0184510 A1* | 6/2021 | Park ................. H02J 50/20 |
| 2021/0242724 A1 | 8/2021 | Muratov et al. |
| 2021/0296938 A1* | 9/2021 | Kwon ................. H02J 50/12 |

FOREIGN PATENT DOCUMENTS

| | | | |
|---|---|---|---|
| CN | 107947395 A | * | 4/2018 |
| CN | 107947395 A | | 4/2018 |
| CN | 207200393 U | | 4/2018 |
| CN | 109804530 A | | 5/2019 |
| EP | 3093955 A1 | | 11/2016 |
| EP | 3107188 A1 | | 12/2016 |
| EP | 3 123 587 B1 | | 2/2017 |
| EP | 3160008 A1 | | 4/2017 |
| KR | 10-2011-0051727 A | | 5/2011 |
| KR | 10-2017-0118571 A | | 10/2017 |
| KR | 2018-0022513 A | | 3/2018 |
| KR | 2018-0065693 A | | 6/2018 |
| TW | 2010-01866 A | | 1/2010 |
| TW | I506916 B | | 11/2015 |
| WO | WO 2005/109598 A1 | | 11/2005 |
| WO | WO 2009/081115 A1 | | 7/2009 |
| WO | WO 2013/164831 A1 | | 11/2013 |
| WO | WO 2013/190809 A1 | | 12/2013 |
| WO | WO 2015/029370 A1 | | 3/2015 |
| WO | WO 2016/006441 A1 | | 1/2016 |
| WO | WO 2017/064955 A1 | | 4/2017 |
| WO | WO 2017/070227 A1 | | 4/2017 |
| WO | WO 2017/194338 A1 | | 11/2017 |
| WO | WO 2018/004120 A1 | | 1/2018 |
| WO | WO 2018/038531 A1 | | 3/2018 |

OTHER PUBLICATIONS

U.S. Appl. No. 15/244,107, filed Aug. 23, 2016, Muratov et al.
U.S. Appl. No. 16/288,556, filed Dec. 20, 2018, Muratov et al.
U.S. Appl. No. 15/957,704, filed Apr. 19, 2018, Muratov et al.
U.S. Appl. No. 15/297,226, filed Oct. 19, 2016, Muratov.
U.S. Appl. No. 17/093,272, filed Nov. 9, 2020, Muratov et al.
U.S. Appl. No. 17/142,953, filed Jan. 6, 2021, Muratov et al.
EP 16194876.5, dated Mar. 24, 2017, Extended European Search Report.
EP 18168832.6, dated Jun. 18, 2018, Extended European Search Report.
EP 19204947.6, dated Apr. 24, 2020, Partial European Search Report.
EP 19204947.6, dated Jun. 12, 2020, Extended European Search Report.
Extended European Search Report for European Application No. EP 16194876.5 dated Mar. 24, 2017.
Extended European Search Report for European Application No. EP 18168832.6 dated Jun. 18, 2018.
Partial European Search Report for European Application No. EP 19204947.6 dated Apr. 24, 2020.
Extended European Search Report for European Application No. EP 19204947.6 dated Jun. 12, 2020.
International Search Report and Written Opinion for International Application No. PCT/CN2019/096846 dated Sep. 26, 2019.
Extended European Search Report for European Application No. EP 19838641.9 dated Feb. 23, 2022.
Extended European Search Report for European Application No. EP 19838135.2 dated Feb. 23, 2022.

* cited by examiner

DETECTING FOREIGN OBJECTS IN WIRELESS POWER TRANSFER SYSTEMS

CROSS-REFERENCE TO RELATED APPLICATIONS

This Application is a Continuation of International Patent Application Serial No. PCT/CN2019/096863, filed Jul. 19, 2019, entitled "DETECTING FOREIGN OBJECTS IN WIRELESS POWER TRANSFER SYSTEMS", which claims priority to U.S. Provisional Application Ser. No. 62/700,371, filed Jul. 19, 2018, entitled "METHODS FOR PORTING MOBILE DEVICE CALIBRATION RESULTS FROM A REFERENCE COIL TO ANY TRANSMITTER COIL IN INDUCTIVE WIRELESS POWER TRANSFER". The entire contents of these applications are incorporated herein by reference in their entirety.

BACKGROUND

1. Technical Field

The techniques described herein relate generally to wireless power delivery, and particularly to detection of foreign objects in the field produced by a wireless power transmitter.

2. Discussion of the Related Art

Wireless Power Transfer Systems (WPTS) are gaining increasing popularity as convenient way to deliver power without wires or connectors. WPTS currently under development in the industry can be separated in two major classes: magnetic induction (MI) systems and magnetic resonance (MR) systems. Both types of systems include a wireless power transmitter and a wireless power receiver. Such systems can be used to power or charge mobile devices such as smartphones or tablet computers, among other applications. Such a mobile device includes a wireless power receiver that can have power transferred thereto wirelessly by a wireless power transmitter. A wireless power transmitter may be within a pad or stand on which the mobile device can be placed, for example, during wireless charging.

Inductive WPTS typically operate in an allocated frequency range of several hundred kilohertz using frequency variation as a power flow control mechanism.

MR WPTS typically operate on a single resonant frequency using input voltage regulation to regulate output power. In typical applications, MR WPTS operate at a frequency of 6.78 MHz.

Several industry committees have been working on developing international standards for consumer products based on wireless power transfer.

SUMMARY

Some embodiments relate to a method of performing foreign object detection for wireless power transfer between a wireless power transmitter and a wireless power receiver, the method comprising, by the wireless power transmitter: measuring Q-factor of a system including the wireless power transmitter and the wireless power receiver to produce a Q-factor measurement; receiving a reference Q-factor of the wireless power receiver; and determining whether a foreign object is present by a comparison of the reference Q-factor and the Q-factor measurement, wherein the comparison is performed taking into account one or more of: a parameter stored by the wireless power transmitter; and a parameter received from the wireless power receiver.

The comparison may be performed taking into account the parameter stored by the wireless power transmitter.

The parameter stored by the wireless power transmitter may comprise one or more of: a Q-factor of the wireless power transmitter when the wireless power transmitter is not loaded by a wireless power receiver; a Q-factor of a reference wireless power transmitter when the reference wireless power transmitter is not loaded by a wireless power receiver; and a ratio of an inductance of the reference wireless power transmitter not loaded with a wireless power receiver to an inductance of the reference wireless power transmitter loaded with a wireless power receiver.

The inductance of the reference wireless power transmitter loaded with a wireless power receiver may be an average of inductance values exhibited with more than two types of wireless power receivers.

The comparison may be performed taking into account the parameter received from the wireless power receiver.

The parameter received from the wireless power receiver may comprise a resonant frequency of a reference wireless power transmitter when loaded with the wireless power receiver.

The comparison may be further performed taking into account the parameter stored by the wireless power transmitter, wherein the parameter stored by the wireless power transmitter comprises a resonant frequency of the reference wireless power transmitter when it is not loaded with a wireless power receiver.

The parameter stored by the wireless power transmitter further may comprise one or more of: a Q-factor of the wireless power transmitter when the wireless power transmitter is not loaded by a wireless power receiver; and a Q-factor of a reference wireless power transmitter when the reference wireless power transmitter is not loaded by a wireless power receiver.

The comparison may be further performed taking into account the parameter stored by the wireless power transmitter, wherein the parameter stored by the wireless power transmitter comprises one or more of: a Q-factor of a reference wireless power transmitter when the reference wireless power transmitter is not loaded by a wireless power receiver; and a resonant frequency of the wireless power transmitter when terminated with a resonant capacitance and wireless power transmitter is not loaded by a wireless power receiver.

The parameter stored by the wireless power transmitter may further comprise a resonant frequency of the reference wireless power transmitter when it is not loaded with a wireless power receiver.

The method may further comprise allowing or disallowing wireless power transfer or adjusting transferred power level, or communicating with the wireless power receiver, based on whether a foreign object is determined to be present.

The method may further comprise, prior to the determining, evaluating the Q-factor measurement to determine whether the wireless power receiver is present.

The Q-factor measurement may be performed in part by taking into account measured resonance frequency of the wireless power transmitter.

The method may further comprise, when the wireless power receiver is determined to be present, increasing a strength of a field produced by the wireless power transmitter prior to receiving the reference Q-factor from the wireless power receiver.

Some embodiments relate to a controller for a wireless power transmitter, comprising: circuitry configured to: measure Q-factor of a system including a wireless power transmitter and a wireless power receiver to produce a Q-factor measurement; receive a reference Q-factor of the wireless power receiver; and determine whether a foreign object is present by a comparison of the reference Q-factor and the Q-factor measurement, wherein the comparison is performed taking into account one or more of: a parameter stored by the wireless power transmitter; and a parameter received from the wireless power receiver.

The comparison may be performed taking into account the parameter stored by the wireless power transmitter.

The parameter stored by the wireless power transmitter may comprise one or more of: a Q-factor of the wireless power transmitter when the wireless power transmitter is not loaded by a wireless power receiver; a Q-factor of a reference wireless power transmitter when the wireless power transmitter is not loaded by a wireless power receiver; and a ratio of an inductance of the reference wireless power transmitter not loaded with a wireless power transmitter to an inductance of the reference wireless power transmitter loaded with a wireless power receiver.

The inductance of the reference wireless power transmitter loaded with a wireless power receiver may be an average of inductance values exhibited with more than two types of wireless power receivers.

The comparison may be performed taking into account the parameter received from the wireless power receiver.

The parameter received from the wireless power receiver may comprise a resonant frequency of a reference wireless power transmitter when loaded with the wireless power receiver.

The comparison may be further performed taking into account the parameter stored by the wireless power transmitter, wherein the parameter stored by the wireless power transmitter comprises a resonant frequency of the reference wireless power transmitter when it is not loaded with a wireless power receiver.

The parameter stored by the wireless power transmitter may further comprise one or more of: a Q-factor of the wireless power transmitter when the wireless power transmitter is not loaded by a wireless power receiver; and a Q-factor of a reference wireless power transmitter when the wireless power transmitter is not loaded by a wireless power receiver.

The comparison may be further performed taking into account the parameter stored by the wireless power transmitter, wherein the parameter stored by the wireless power transmitter comprises one or more of: a Q-factor of a reference wireless power transmitter when the wireless power transmitter is not loaded by a wireless power receiver; and a resonant frequency of the wireless power transmitter when terminated with a resonant capacitance and wireless power transmitter is not loaded by a wireless power receiver.

The parameter may further comprise a resonant frequency of the reference wireless power transmitter when it is not loaded with a wireless power receiver.

The circuitry may be configured to allow or disallow wireless power transfer or adjust transferred power level, or communicate with the wireless power receiver, based on whether a foreign object is determined to be present.

The circuitry may be configured to: prior to the determining, evaluate the Q-factor measurement to determine whether the wireless power receiver is present.

The Q-factor measurement may be performed in part by taking into account measured resonance frequency of the wireless power transmitter.

The circuitry may be configured to: when the wireless power receiver is determined to be present, increasing a strength of a field produced by the wireless power transmitter prior to receiving the reference Q-factor from the wireless power receiver.

Some embodiments relate to a wireless power transmitter, comprising: a controller configured to: measure Q-factor of a system including a wireless power transmitter and a wireless power receiver to produce a Q-factor measurement; receive a reference Q-factor of the wireless power receiver; and determine whether a foreign object is present by a comparison of the reference Q-factor and the Q-factor measurement, wherein the comparison is performed taking into account one or more of: a parameter stored by the wireless power transmitter; and a parameter received from the wireless power receiver.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Wireless power transfer can be degraded due to the presence of a foreign object in the field produced by the wireless power transmitter. Conductive objects such as metallic objects may absorb power due to the inducement of eddy currents in the conductive object. The presence of such an object can significantly degrade the efficiency of the wireless power transmission. If a metal object is present, efficiency may be reduced substantially (e.g., from 90% to 40%). Further, due to the power absorbed, the temperature of the object may increase significantly, which may be undesirable. Techniques have been developed for sensing the presence of a foreign object by measuring the quality factor (Q-factor) for wireless power transmission by the wireless power receiver. According to such techniques, measuring the Q-factor can be used to determine if a foreign object is present, as the presence of a foreign object reduces the Q-factor of the system. If the Q-factor is outside of an acceptable range, it may be determined that a foreign object is present, and wireless power transmission is disabled. On the other hand, if the Q-factor within an acceptable range, it may be determined that no foreign object is present, and wireless power transmission may be allowed. To determine whether the measured Q-factor is within an acceptable range, one technique is for the wireless power receiver to store a reference Q-factor for the wireless power receiver. The reference Q-factor of the wireless power receiver may have been measured with a reference wireless power transmitter. To perform foreign object detection the wireless power receiver may transmit its reference Q-factor to the wireless power transmitter. The wireless power transmitter may compare the reference Q-factor with a Q-factor measured by the wireless power transmitter. If the reference and measured Q-factors are sufficiently close to one another (e.g., within a threshold amount) it may be determined that no foreign object is present. However, if the measured Q-factors are not sufficiently close to one another, it may be determined that a foreign object is present.

The present inventor has recognized and appreciated that the above-described technique for detecting a foreign object may not accurately detect whether a foreign object is present in some circumstances. For example, if the frequency at which the wireless power transmitter measures the Q-factor is different from the frequency at which the reference Q-factor was determined, the comparison between the reference and measured Q-factors may not be a suitable comparison, as Q-factor may vary with the resonant frequency of the system. One technique involves measuring the reference Q-factor at a frequency of 100 kHz. The inventor has appreciated that in practice, when the wireless power transmitter measures the Q-factor in the presence of the wireless power receiver, the resonant frequency may be in a range of 90-110 kHz, for example, and may vary from the 100 kHz frequency at which the reference Q-factor of the wireless power receiver was measured.

The inventor has appreciated the accuracy of foreign object detection may be increased by taking into account additional information when comparing the reference Q-factor to the measured Q-factor. The additional information may be one or more parameters of the wireless power receiver, the wireless power transmitter and/or a reference wireless power transmitter used to measure the reference Q-factor, for example. The parameter(s) may be stored in the wireless power transmitter and evaluated in an expression or equation to perform an adjusted comparison of the reference Q-factor and measured Q-factor. Performing an adjusted comparison of the reference Q-factor and measured Q-factor can improve the accuracy of foreign object detection.

Figure 1:
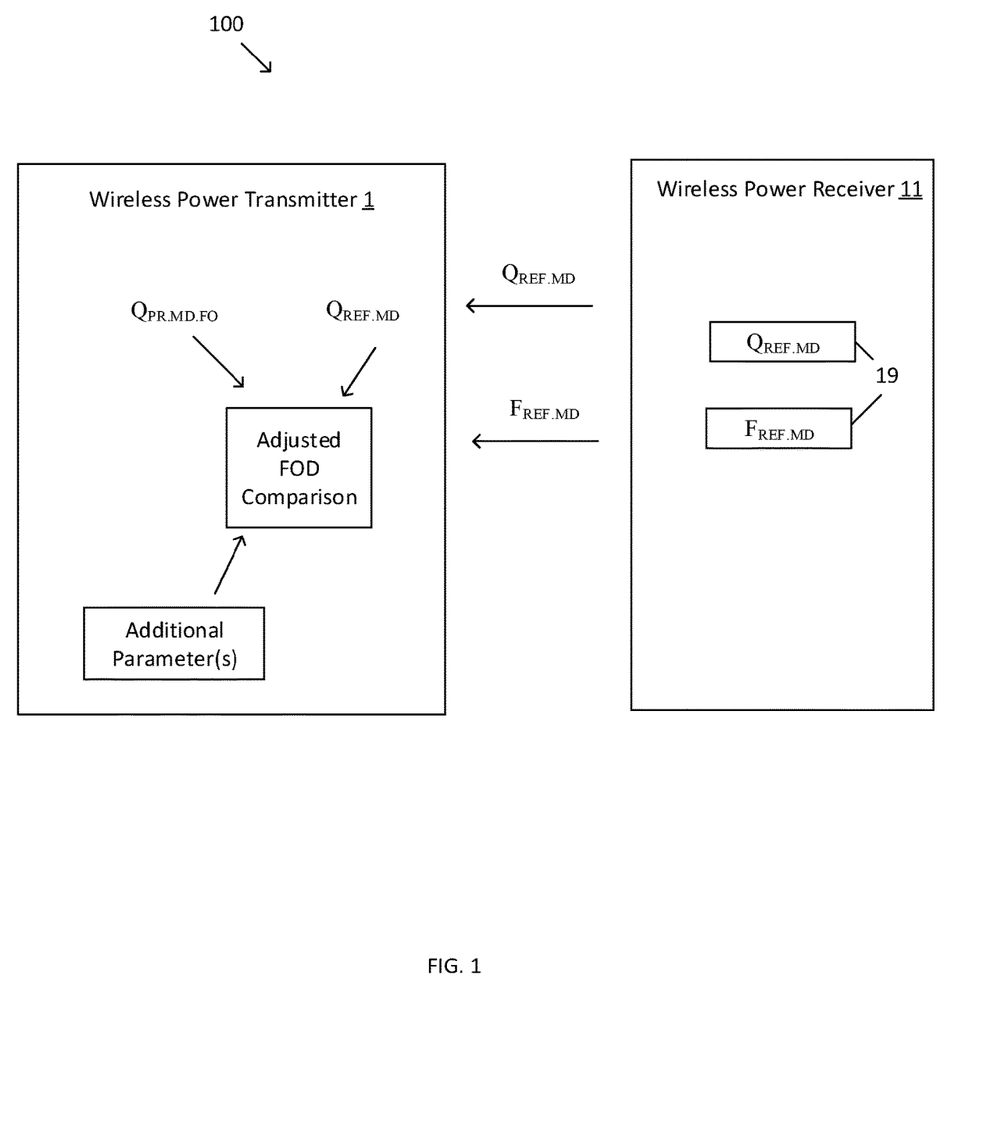
FIG. 1 shows a block diagram of a wireless power system including a wireless power transmitter and a wireless power receiver that provides a reference Q-factor and optionally a reference frequency to the wireless power transmitter for foreign object detection (FOD).

FIG. 1 shows a block diagram of a wireless power system 100 including a wireless power transmitter 1 and a wireless power receiver 11. The wireless power transmitter 1 and wireless power receiver 11 may communicate with one another through in-band or out of band communication. The techniques described herein are not limited as to the communication technique used to transfer this information. Prior to the wireless power transmitter 1 initiating wireless power transfer, the wireless power receiver 11 may send reference information to the wireless power transmitter 1. The reference information may include a reference Q-factor ($Q_{REF\_MD}$). Optionally, the reference information may also include a reference frequency ($F_{0\_REF\_MD}$) which may be a self-resonant frequency of the reference transmitter with the wireless power receiver 11 mounted in the charging position.

In some embodiments, the reference Q-factor and/or the reference frequency may have been measured during a calibration process and stored in at least one storage device 19 of the wireless power receiver 11, which may be any suitable type of computer-readable storage such as a memory or register, for example. The calibration process may be performed by a reference wireless power transmitter having known parameters or by measurement equipment such as an LCR meter. LCR meters usually perform measurements of Q-factor and coil inductance at the same time at fixed frequency. This frequency may differ from the self-oscillating frequency exhibited by the test transmitters, hence measurements of Q-factor may need be normalized to be compared. However, the techniques described herein are not limited as to techniques for measuring the reference frequency and reference Q-factor of the wireless power receiver.

Wireless power transmitter 1 may perform measurements to measure the Q-factor of the system 100 including the wireless power transmitter 1 and wireless power receiver 11. The measured Q-factor is $Q_{PR\_MD\_FO}$. Any suitable techniques for measuring Q-factor may be used, a number of which are known in the art and some of which are described herein by way of example. In some embodiments, a no-power transfer time window can be incorporated into the wireless power transmitter operating routine for the purpose of measuring Q-factor.

Figure 2:
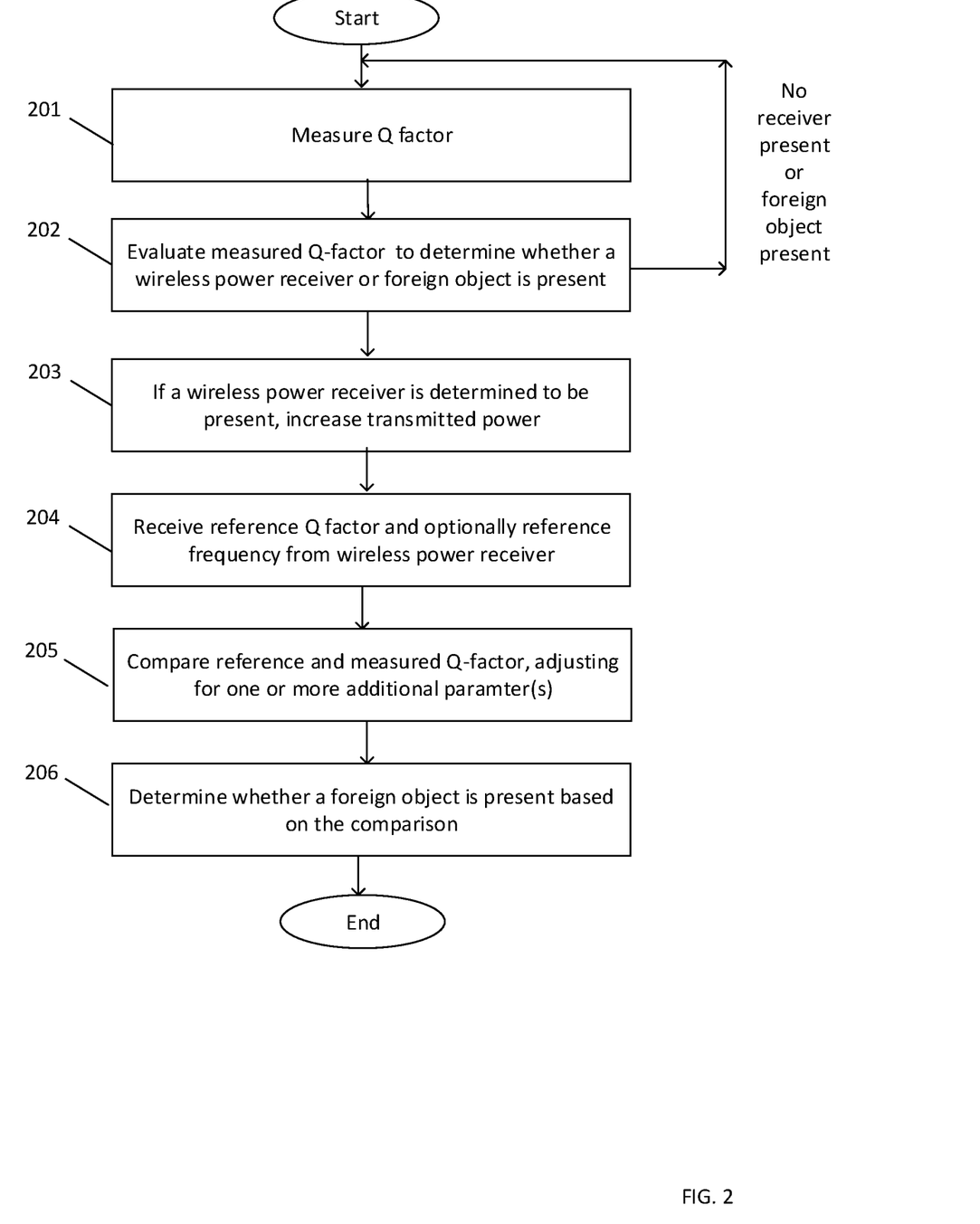
FIG. 2 shows a flowchart of a method of performing foreign object detection, according to some embodiments.

FIG. 2 shows a flowchart of a method of performing foreign object detection (FOD), according to some embodiments. The method of FIG. 2 may be performed by a controller of the wireless power transmitter, for example.

In step 201, the wireless power transmitter 1 measures the Q-factor for wireless power transmission. The measurement may be performed before the wireless power receiver is in communication with the wireless power transmitter. The measurement may be made by energizing the transmit coil of the wireless power transmitter with relatively low energy, below the level of energy that would energize the wireless power receiver. Such a measurement can help determine whether a wireless power receiver is present. The controller of the wireless power transmitter may control such measurements. Any of a variety of suitable of measurement techniques may be used, such as time-domain measurements or frequency domain measurements, for example. Examples of suitable measurements are described in U.S. Published Patent Application 2018/0241257 to Muratov et al., which is hereby incorporated by reference in its entirety.

In step 202, a determination is based on the measured Q-factor as to whether a wireless power receiver potentially is present or if a foreign object can be determined to be present based on measured Q-factor without any reference information from the wireless power receiver. For example, a moderate change in the Q-factor with respect to an unloaded wireless power transmitter may indicate a wireless power receiver is potentially present. A significant change in the Q-factor may indicate that a foreign object is present. For example, if a very low Q-factor is measured, this may be indicative of the presence of a foreign object. If a foreign object is determined to be present or no potential wireless power receiver is detected, the process may start over at the beginning. The wireless power transmitter may repeatedly perform measurements in this manner until a potential wireless power receiver is detected.

If a potential wireless power receiver is detected, the wireless power transmitter may increase the transmit power in step 203 to attempt to energize the wireless power receiver and initiate communication. If a wireless power receiver is present then communications are initiated between the wireless power transmitter and the wireless power receiver. They can then exchange information, and the wireless power receiver provides its reference information so that a more fine-grained foreign object detection technique may be performed.

In step 204, the reference Q-factor of the wireless power receiver and optionally the reference frequency of a wireless power receiver may be received by the wireless power transmitter (e.g., received by the controller through a communication interface of the wireless power transmitter). As discussed above, the reference Q-factor and/or reference frequency may be received from the wireless power receiver, for example. Any suitable communication technique may be used to send the information, such as wireless radio communication, for example.

In step 205, an adjusted comparison may be performed between the reference Q-factor and measured Q-factor in view of additional information such as one or more parameters of the wireless power receiver, the wireless power transmitter and/or a reference wireless power transmitter used to measure the reference Q-factor, for example. Such parameters may be received from the wireless power receiver or stored in the wireless power transmitter (e.g., upon manufacturing and/or programming). The parameters may be evaluated along with the reference Q-factor and measured Q-factor and evaluated as an expression or equation to perform an adjusted comparison of the reference Q-factor and measured Q-factor.

In step 206, a determination is made of whether a foreign object is present based on the comparison. For example, if the comparison indicates the reference and measurement Q-factors are similar to one another, after adjusting for the one or more additional parameters, it may be determined that no foreign object is present. If the comparison indicates that the reference and measurement Q-factors are not similar to one another, after adjusting for the one or more additional parameters, it may be determined that a foreign object is present. If it is determined that a foreign object is not present, the wireless power transmitter may be allowed to initiate or continue wireless power transfer or allowed to increase the power level of the wireless power transfer. If it is determined that a foreign object is present, the wireless power transmitter may be prevented from initiating or continuing wireless power transfer or controlled to decrease the power level of wireless power transfer.

Example Adjusted Comparisons

Adjusted comparisons between measured and reference Q-factors may be performed in a variety of suitable ways, and with a number of different parameters, examples of which are described below. A list of parameters used in the equations and expressions is provided first, followed by several examples of adjusted comparisons. It should be appreciated that these are examples, and a variety of suitable adjustments may be made to the comparison.

Parameters Description $Q_{PR.MD}^{scaled}$—is an expected value of the Q-factor of the wireless power transmitter 1 when the wireless power receiver 11 is placed on the wireless power transmitter 1.

$$RATL_{AVE} = \left(\frac{L_{REF.C}}{L_{REF.MD}}\right)$$

is the ratio of an inductance of not loaded reference coil of the reference wireless power transmitter to inductance of the reference coil of the reference wireless power transmitter loaded with a mobile device. Loaded means that the mobile device is equipped with wireless charger and is placed in a charging position at wireless power transmitter. This value can be an average value obtained with a substantial representation of various mobile devices.

$Q_{PR.MD.FO}$—measured value of the Q-factor of the wireless power transmitter 1 when it is loaded with the wireless power receiver 11 and presence of foreign objects anticipated.

$Q_{REF.C}$—Q-factor of an unloaded reference coil of a reference wireless power transmitter;

$f_{REF.C}$—frequency the $Q_{REF.C}$ was measured or the reference coil of a reference wireless power transmitter self-oscillates at when $Q_{REF.C}$ is measured;

$Q_{REF.MD}$—Q-factor of the reference coil of a reference wireless power transmitter when loaded with the wireless power receiver 11 when absence of foreign object is assured;

$f_{REF.MD}$—the self-resonant frequency of the reference coil of a reference wireless power transmitter when loaded with the wireless power receiver 11;

$Q_{PR.C}$—Q-factor of an unloaded wireless power transmitter 1;

$f_{PR.C}$—practical transmitter 1 coil self-resonant frequency when terminated with $C_{PR}$—the resonant capacitance; in not loaded condition;

$Q_{PR.MD}$—Q-factor of the wireless power transmitter 1 loaded with the wireless power receiver with no foreign object present;

$f_{PR.MD}$—frequency at which the transmit coil of the wireless power transmitter 1 resonates in presence of the wireless power receiver 11 and no foreign object.

Margin—a threshold difference between Q-factor 'good' values and 'bad' values. Can have positive or negative value;

$f_{PR.MD.FO}$—frequency at which practical transmitter coil resonates in presence of mobile device and the foreign object.

Example 1

$$Q_{PR.MD}^{scaled} = \left[\frac{1}{Q_{REF.MD}} + \left(\frac{Q_{REF.C} - Q_{PR.C}}{Q_{REF.C} \cdot Q_{PR.C} \cdot RATL_{AVE}}\right)\right]^{-1}; \quad (1)$$

Foreign Object Detection Criterion

FO present if $Q_{PR.MD\_FO} < Q_{PR.MD}^{scaled}$ –Margin

Parameters publically known:

$Q_{REF.C}$; $f_{REF.C}$;

Parameters based on calibration of the Mobile Device (MD) performed on the reference publically-known coil and sent from wireless power receiver to wireless power transmitter:

$Q_{REF.MD}$; $f_{REF.MD}$

Parameters made available in the wireless power transmitter:

By design—$Q_{PR.C}$; $f_{PR.C}$; $C_{PR}$; $Q_{PR.MD}$; $f_{PR.MD}$; Margin; RATL;

By performing measurement during wireless power transmitter operation—$Q_{PR.MD.FO}$; $f_{PR.MD.FO}$;

Alternative Scaling Equations $$Q_{PR\_MD}^{scaled} = \left[\frac{1}{Q_{REF.MD}} + \left(\frac{1}{Q_{PR.C}} - \frac{1}{Q_{REF.C}}\right)\frac{1}{RATL}\right]^{-1}; \quad (2)$$

$$RATL = \frac{L_{REF.C}}{L_{REF.MD}}; \quad (3)$$

RATL—ratio of inductances. The average value of ratios of the reference coil native inductance to the inductance of the reference TX coil loaded with a given mobile device, or representative number of various mobile devices.

Other alternative derivations or simplifications of shown expressions can be used to achieve the same or close results Example 2

Substitute for $RATL \approx (f_{REF.MD}/f_{REF.C})^2$ $$Q_{PR\_MD}^{scaled} = \left[\frac{1}{Q_{REF.MD}} + \left(\frac{Q_{REF.C} - Q_{PR.C}}{Q_{REF.C} \cdot Q_{PR.C}}\right) \cdot \left(\frac{f_{REF.C}}{f_{REF.MD}}\right)^2\right]^{-1}; \quad (4)$$

Foreign Object Detection Criterion
FO present if $Q_{PR.MD.FO} < Q_{PR.MD}^{scaled} - $ Margin
Parameters publically known:
$Q_{REF.C}$; $f_{REF.C}$;
Parameters based on calibration of the Mobile Device (MD) performed on the reference publically-known coil and sent from wireless power receiver to wireless power transmitter:
$Q_{REF.MD}$; $f_{REF.MD}$
Parameters made available in the wireless power transmitter:
By design—$Q_{PR.C}$; $f_{PR.C}$; $C_{PR}$; $Q_{PR.MD}$; $f_{PR.MD}$; Margin;
By performing measurement during wireless power transmitter operation—$Q_{PR.MD.FO}$; $f_{PR.MD.FO}$;

Example 3

Additional correction of Example 2 by a ratio of native frequencies of reference and practical coils $$RATL \cong \left(\frac{f_{REF.MD}}{f_{REF.C}} \cdot \frac{f_{REF.C}}{f_{PR.C}}\right)^2 = \left(\frac{f_{REF.MD}}{f_{PR.C}}\right)^2;$$

$$Q_{PR\_MD}^{scaled} = \left[\frac{1}{Q_{REF.MD}} + \left(\frac{Q_{REF.C} - Q_{REF.MD}}{Q_{REF.C} \cdot Q_{REF.MD}}\right) \cdot \left(\frac{f_{PR.C}}{f_{REF.MD}}\right)^2\right]^{-1}; \quad (5)$$

Foreign Object Detection Criterion
FO present if $Q_{PR.MD.FO} < Q_{PR.MD}^{scaled} - $ Margin
Parameters publically known:
$Q_{REF.C}$; $f_{REF.C}$;
Parameters based on calibration of the Mobile Device (MD) performed on the reference publically-known coil and sent from wireless power receiver to wireless power transmitter:
$Q_{REF.MD}$ $f_{REF.MD}$
Parameters made available in the wireless power transmitter:
By design—$Q_{PR.C}$; $f_{PR.C}$; $C_{PR}$; $Q_{PR.MD}$; $f_{PR.MD}$; Margin;
By performing measurement during wireless power transmitter operation—$Q_{PR.MD.FO}$; $f_{PR.MD.FO}$;

Example 4

$$Q_{PR\_MD}^{scaled} = \left[\frac{1}{Q_{REF.MD}} + \left(\frac{(Q_{REF.C} - Q_{REF.MD}) \cdot f_{REF.C} \cdot f_{PR.C}}{Q_{REF.C} \cdot Q_{REF.MD} \cdot f_{REF.MD}^2}\right)\right]^{-1}; \quad (6)$$

Foreign Object Detection Criterion
FO present if $Q_{PR.MD.FO} < Q_{PR.MD}^{scaled} - $ Margin
Parameters publically known:
$Q_{REF.C}$; $f_{REF.C}$;
Parameters based on calibration of the Mobile Device (MD) performed on the reference publically-known coil and sent from wireless power receiver to wireless power transmitter:
$Q_{REF.MD}$; $f_{REF.MD}$
Parameters made available in the wireless power transmitter:
By design—$Q_{PR.C}$; $f_{PR.C}$; $C_{PR}$; $Q_{PR.MD}$; $f_{PR.MD}$; Margin;
By performing measurement during wireless power transmitter operation—$Q_{PR.MD.FO}$; $f_{PR.MD.FO}$;

System Description and Q-Factor and Fo Measurements

The techniques and devices described herein enable the detection of a foreign object using relatively low power levels. In some embodiments, detection may be performed by energizing and controlling the drive circuit of a wireless power transmitter, and measuring a characteristic of a transient in the wireless power transmitter to measure Q-factor. Based on the transient characteristic the wireless power transmitter can determine whether a foreign object is present in the field produced by the wireless power transmitter. However, Q-factor can be measured in any suitable way, and is not limited to measuring a characteristic of a transient. In some embodiments, the Q-factor may be detected by frequency-domain measurements, or a combination of time-domain and frequency-domain measurements.

Figures 2, 3:
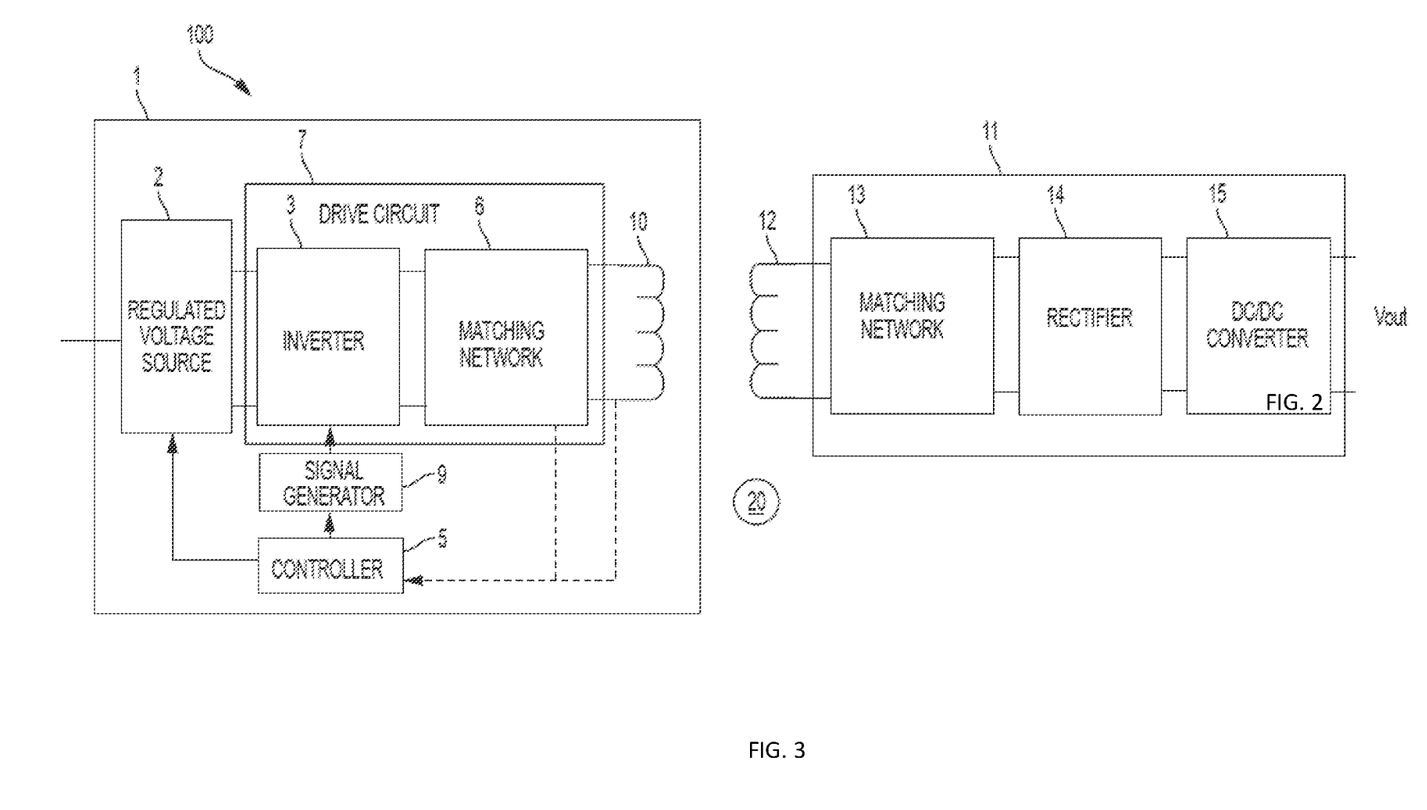
FIG. 3 shows a block diagram of a wireless power system including a wireless power transmitter and a wireless power receiver.

FIG. 3 shows a block diagram of the wireless power system 100 including a wireless power transmitter 1 and a wireless power receiver 11. The wireless power transmitter 1 has a drive circuit 7 including an inverter 3 that drives a transmit coil 10 through a matching network 6. The wireless power transmitter 1 may include a regulated voltage source 2 (e.g., a voltage regulator) that provides a regulated DC voltage to the inverter 3. The regulated voltage source 2 produces a regulated DC output voltage in response to control stimulus from the controller 5. In some embodiments, the drive circuit 7 may be a class D or E amplifier that converts the DC voltage at the input of inverter 3 into an AC output voltage to drive the transmit coil 10. Producing an AC output voltage enables wireless power transmission through electromagnetic induction. The controller 5 may control a signal generator 9 to drive the inverter 3 with signals of a selected wireless power transmission frequency. As an example, the inverter 3 may be switched at a frequency between 100 and 205 kHz to transmit power to a wireless power receiver designed to receive wireless power according to the Qi specification for low power Qi receivers and 80-300 kHz for medium power Qi receivers. The inverter 3 may be switched at a higher frequency, such as a frequency of greater than 1 MHz, within an ISM band, e.g., 6.765 MHz to 6.795 MHz, to transmit power to a receiver designed to receive wireless power using MR technology. However, these frequencies are described merely by way of example, as wireless power may be transmitted at a variety of suitable frequencies, in accordance with any suitable specification. Controller 5 may be an analog circuit or a digital circuit. Controller 5 may be programmable, and may command signal generator 9 to produce signals at a desired transmission frequency based on stored program instructions, so that inverter 3 switches at the desired transmission frequency. Matching network 6 may facilitate wireless power delivery by presenting a suitable impedance to the inverter 3. The matching network(s) may have one or more capacitive or inductive elements or any suitable combination of capacitive and inductive elements. Since the transmit coil 10 may have an inductive impedance, in some embodiments the matching network 6 may include one or more capacitive elements, which, when combined with the impedance(s) of the transmit coil 10, presents an impedance to the output of inverter 3 suitable for driving the transmit coil 10. In some embodiments, during wireless power transfer the resonant frequency of the matching network 6 may be set equal to or approximately equal to the switching frequency of the inverter 3. The transmit coil 10 may be realized by any suitable type of conductors. The conductors may be wires, including solid wire or Litz wire, or patterned conductors, such as patterned conductors of a PC board or an integrated circuit.

The AC current in the transmit coil 10 generates an oscillating magnetic field in accordance with Ampere's law. The oscillating magnetic field induces an AC voltage into a receiver coil 12 of the wireless power receiver 11 in accordance with Faraday's law. The AC voltage induced in the receiver coil 12 is provided through a matching network 13 to a rectifier 14 that generates an unregulated DC voltage. Rectifier 14 may be a synchronous rectifier or may be implemented using diodes. The unregulated DC voltage is regulated using a DC/DC converter 15, the output of which may be filtered and provided to a load as output voltage Vout. In some alternate embodiments the DC/DC converter 15 can be replaced by a linear regulator or battery charger, or eliminated altogether. In some embodiments, the wireless power transmitter 1 may have communication circuitry (e.g., within controller 5) for communicating with wireless power receiver 11 either through in-band communication or out of band communication. Similarly, wireless power receiver 11 may have communication circuitry for communicating with a wireless power transmitter 1. The wireless power receiver 11 may send feedback information to the wireless power transmitter 1 indicating the power demanded at the wireless power receiver 11, or a change in the power level to be provided. In response, the wireless power transmitter 1 may increase or decrease its power output accordingly. The wireless power transmitter 1 may control the amount of power transmitted by varying the voltage drive level, the frequency of the signal transmitted or both. Any suitable power control techniques may be used.

As shown in FIG. 3, if a conductive foreign object 20 enters the field produced by the transmit coil 10 of the wireless power transmitter 1, the wireless power transmission efficiency may be degraded and/or the conductive foreign object 20 may undergo significant heating. Examples of conductive foreign objects 20 include coins, paperclips, and keys, by way of illustration.

Experimental Data

Figure 4:
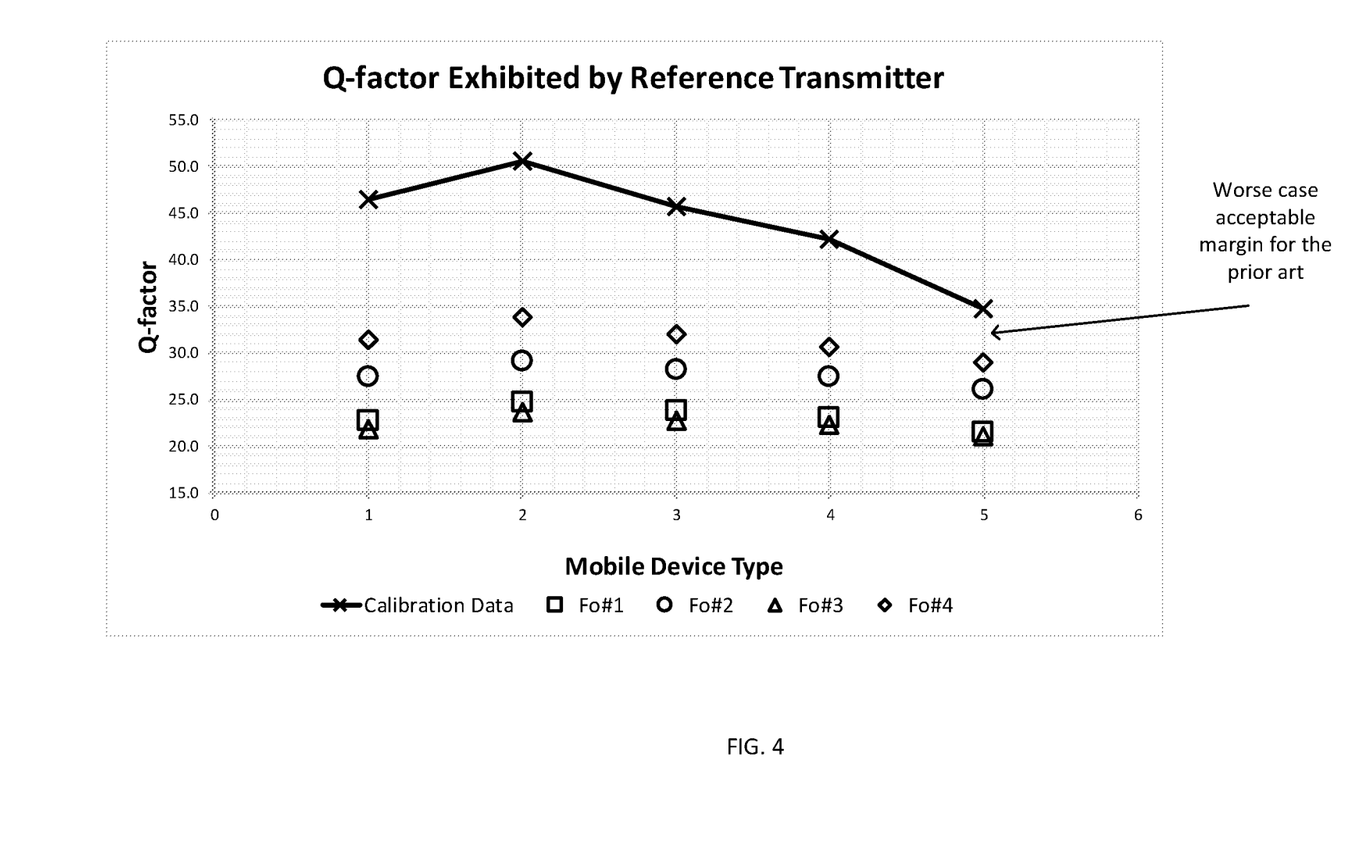
FIG. 4 illustrates calibration data, which is the Q-factor measured with a reference transmitter loaded with various types of wireless power receivers (e.g., mobile devices), labeled 1-5, with no foreign object present.
Figure 5:
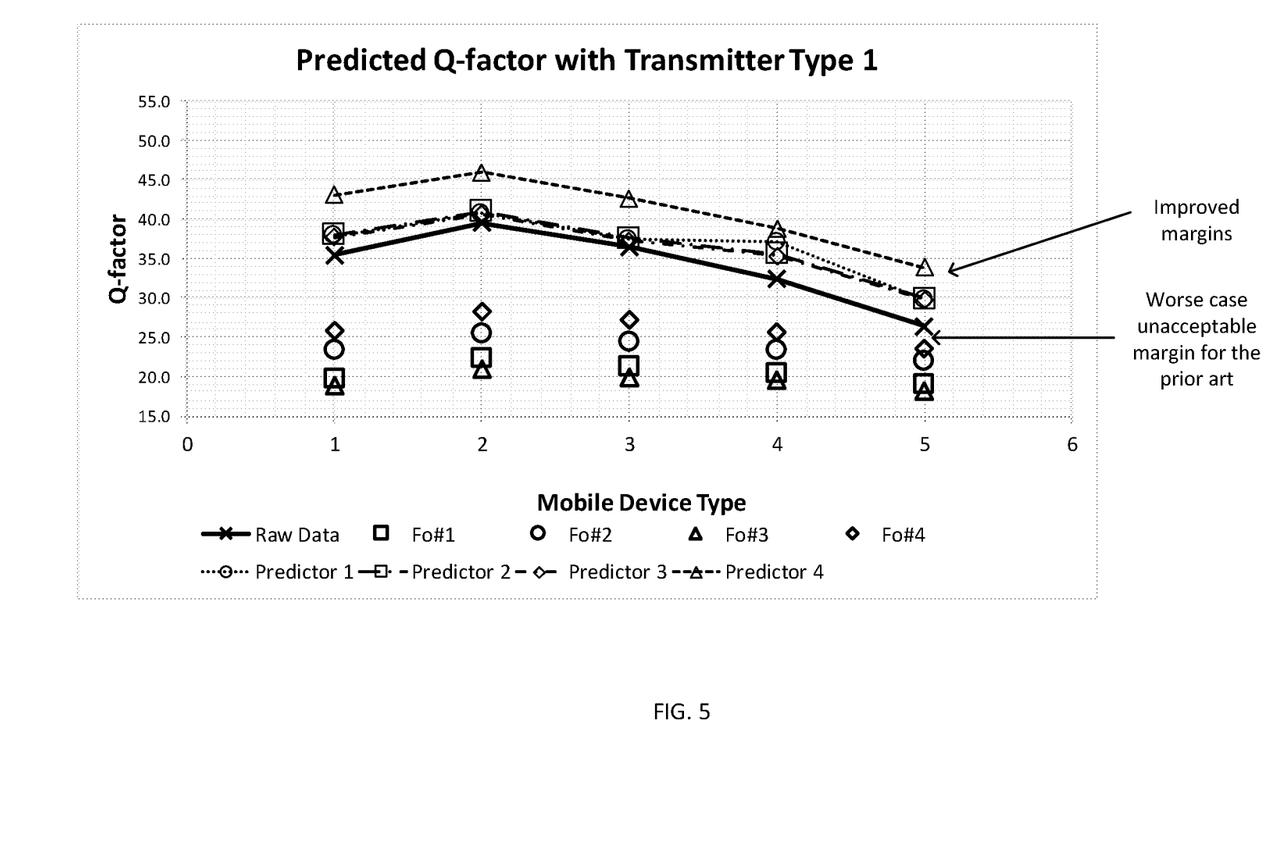
FIG. 5 illustrates raw data, which is the Q-factor measured on a practical wireless power transmitter, Type 1, in the presence of wireless power receivers 1-5 with no foreign object present.
Figure 6:
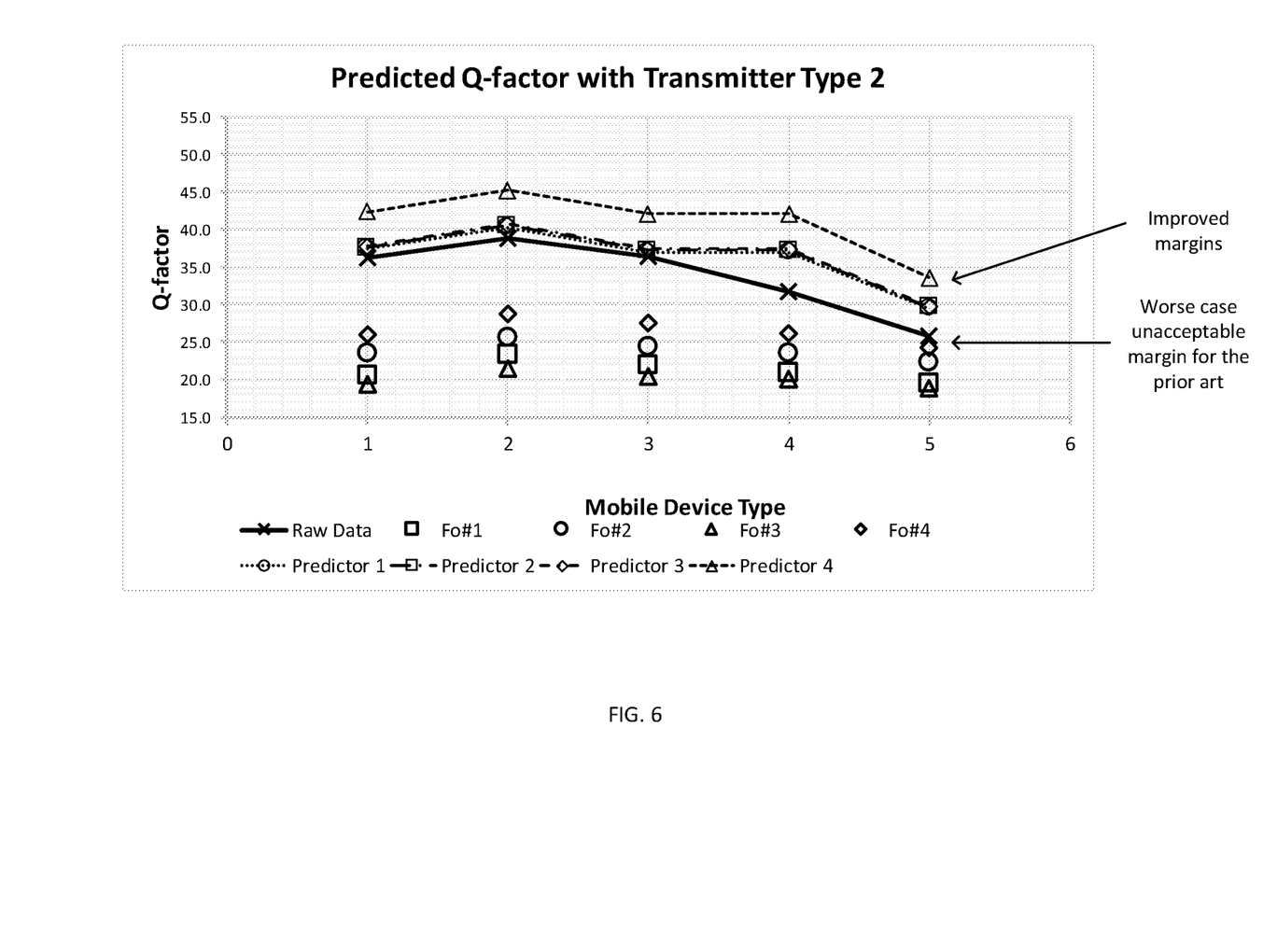
FIG. 6 shows a similar plot as FIG. 5 but for a Type 2 practical wireless power receiver.

FIG. 4-6 illustrate how the example calculations can improve the ability to distinguish whether a foreign object is present from the case when no foreign object is present.

FIG. 4 illustrates calibration data, which is the Q-factor measured with a reference transmitter loaded with various types of wireless power receivers (e.g., mobile devices), labeled 1-5, with no foreign object present. Also illustrated are Q-factor measurements by the reference transmitter when loaded with the same types of wireless power receivers, with different types of foreign objects present, labeled FO #1 to FO #4. Four Qi-standard foreign objects were used: FO #1—stainless disk; FO #2—stainless ring; FO #3—Aluminum foil disk; and FO #4—the thick aluminum disk. As illustrated, without a foreign object present the measured Q-factor is in the range of 35-50. The presence of a foreign object reduces the measured Q-factor by different amounts for different foreign objects and types of receivers. Distinguishing between a foreign object being present and not present may be challenging, as the difference in Q-factor between the two cases may be relatively small. For example, for mobile device type 5, the margin between Q-factor measurements with no foreign object present and with FO #4 present is only about 5.

FIG. 5 illustrates raw data, which is the Q-factor measured on a practical wireless power transmitter, Type 1, in the presence of wireless power receivers 1-5 with no foreign object present. Also illustrated in FIG. 5 are Q-factor measurements by the Type 1 wireless power transmitter when loaded with the same types of wireless power receivers, with different types of foreign objects present, labeled FO #1 to FO #4. The difference in Q-factor between a foreign object being present and not present is lower than in the case of the reference coil in FIG. 4, particularly for wireless power receiver 5 and FO #4. Also illustrated in FIG. 5 are predictors 1-4, which are calculated Q-factor values compensated based on the equations described herein corresponding to Examples 1-4, respectively. As shown in FIG. 5, the values of predictors (compensated Q-factors) are higher than the raw data and provide a larger margin between the case when a foreign object is present and no foreign object is present.

FIG. 6 shows a similar plot as FIG. 5 but for a Type 2 practical wireless power transmitter. FIG. 6 illustrates raw data, which is the Q-factor measured on a practical wireless power transmitter, Type 2, in the presence of wireless power receivers 1-5 with no foreign object present. Also illustrated in FIG. 6 are Q-factor measurements by the Type 2 wireless power transmitter when loaded with the same types of wireless power receivers, with different types of foreign objects present, labeled FO #1 to FO #4. The difference in Q-factor between a foreign object being present and not present is lower than in the case of the reference coil in FIG. 4, particularly for wireless power receiver 5 and FO #4, and practically not detectable unless compensation is performed. Also illustrated in FIG. 6 are predictors 1-4, which are calculated Q-factor values compensated based on the equations described herein corresponding to Examples 1-4, respectively. As shown in FIG. 6, the values of predictors (compensated Q-factors) are higher than the raw data and provide a larger margin between the case when a foreign object is present and no foreign object is present.

Parameters of the above-described coil types:
1. Reference coil
    a. Inductance—24 uH
    b. Number of turns —20 in two layers
    c. Outer diameter Ø43.0 mm
    d. Inner diameter Ø20.5 mm 2. Practical Transmitter Type 1
   a. Inductance—10 uH
   b. Number of turns—12 in one layer
   c. Outer dimensions □48 mm×48 mm
   d. Inner dimensions □19 mm×19 mm
3. Practical Transmitter Type 2
   a. Inductance—8.9 uH
   b. Number of turns —11 in one layer
   c. Outer diameter Ø48.5 mm
   d. Inner diameter Ø23.0 mm Additional Aspects As discussed above, a multi-mode wireless power transmitter may be controlled using controller 5, which may be implemented by any suitable type of circuitry. For example, the controller 5 may be implemented using hardware or a combination of hardware and software. When implemented using software, suitable software code can be executed on any suitable processor (e.g., a microprocessor) or collection of processors. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, or other tangible, non-transitory computer-readable storage medium) encoded with a computer program (i.e., a plurality of executable instructions) that, when executed on one or more processors, performs the above-discussed functions of one or more embodiments. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of performing foreign object detection for wireless power transfer between a wireless power transmitter and a wireless power receiver, the method comprising, by the wireless power transmitter:

measuring Q-factor of a system including the wireless power transmitter and the wireless power receiver to produce a Q-factor measurement;

receiving a reference Q-factor of the wireless power receiver; and determining whether a foreign object is present by a comparison of the reference Q-factor and the Q-factor measurement, wherein the comparison is performed taking into account one or more of:

a parameter stored by the wireless power transmitter, wherein the parameter stored by the wireless power transmitter comprises one or more of: a Q-factor of the wireless power transmitter when the wireless power transmitter is not loaded by a wireless power receiver; a Q-factor of a reference wireless power transmitter when the reference wireless power transmitter is not loaded by a wireless power receiver; and a ratio of an inductance of the reference wireless power transmitter not loaded with a wireless power receiver to an inductance of the reference wireless power transmitter loaded with a wireless power receiver; and a parameter received from the wireless power receiver, wherein the parameter received from the wireless power receiver comprises a resonant frequency of a reference wireless power transmitter when loaded with the wireless power receiver.

2. The method of claim 1, wherein the comparison is performed taking into account the parameter stored by the wireless power transmitter.

3. The method of claim 2, wherein the parameter stored by the wireless power transmitter comprises one or more of:

a Q-factor of the wireless power transmitter when the wireless power transmitter is not loaded by a wireless power receiver;

a Q-factor of a reference wireless power transmitter when the reference wireless power transmitter is not loaded by a wireless power receiver; and a ratio of an inductance of the reference wireless power transmitter not loaded with a wireless power receiver to an inductance of the reference wireless power transmitter loaded with a wireless power receiver.

4. The method of claim 3, wherein the inductance of the reference wireless power transmitter loaded with a wireless power receiver is an average of inductance values exhibited with more than two types of wireless power receivers.

5. The method of claim 1, wherein the comparison is performed taking into account the parameter received from the wireless power receiver.

6. The method of claim 5, wherein the parameter received from the wireless power receiver comprises a resonant frequency of a reference wireless power transmitter when loaded with the wireless power receiver.

7. The method of claim 6, wherein the comparison is further performed taking into account the parameter stored by the wireless power transmitter, wherein the parameter stored by the wireless power transmitter comprises a resonant frequency of the reference wireless power transmitter when it is not loaded with a wireless power receiver.

8. The method of claim 7 wherein the parameter stored by the wireless power transmitter further comprises one or more of:

a Q-factor of the wireless power transmitter when the wireless power transmitter is not loaded by a wireless power receiver; and a Q-factor of a reference wireless power transmitter when the reference wireless power transmitter is not loaded by a wireless power receiver.

9. The method of claim 6, wherein the comparison is further performed taking into account the parameter stored by the wireless power transmitter, wherein the parameter stored by the wireless power transmitter comprises one or more of:
a Q-factor of a reference wireless power transmitter when the reference wireless power transmitter is not loaded by a wireless power receiver; and
a resonant frequency of the wireless power transmitter when terminated with a resonant capacitance and wireless power transmitter is not loaded by a wireless power receiver.

10. The method of claim 9, wherein the parameter stored by the wireless power transmitter further comprises a resonant frequency of the reference wireless power transmitter when it is not loaded with a wireless power receiver.

11. The method of claim 1, further comprising allowing or disallowing wireless power transfer or adjusting transferred power level, or communicating with the wireless power receiver, based on whether a foreign object is determined to be present.

12. The method of claim 1, further comprising:
prior to the determining, evaluating the Q-factor measurement to determine whether the wireless power receiver is present.

13. The method of claim 1, wherein the Q-factor measurement is performed in part by taking into account measured resonance frequency of the wireless power transmitter.

14. The method of claim 11, further comprising:
when the wireless power receiver is determined to be present, increasing a strength of a field produced by the wireless power transmitter prior to receiving the reference Q-factor from the wireless power receiver.

15. A controller for a wireless power transmitter, comprising:
circuitry configured to:
measure Q-factor of a system including a wireless power transmitter and a wireless power receiver to produce a Q-factor measurement;
receive a reference Q-factor of the wireless power receiver; and
determine whether a foreign object is present by a comparison of the reference Q-factor and the Q-factor measurement, wherein the comparison is performed taking into account one or more of:
a parameter stored by the wireless power transmitter, wherein the parameter stored by the wireless power transmitter comprises one or more of: a Q-factor of the wireless power transmitter when the wireless power transmitter is not loaded by a wireless power receiver; a Q-factor of a reference wireless power transmitter when the reference wireless power transmitter is not loaded by a wireless power receiver; and a ratio of an inductance of the reference wireless power transmitter not loaded with a wireless power receiver to an inductance of the reference wireless power transmitter loaded with a wireless power receiver; and
a parameter received from the wireless power receiver, wherein the parameter received from the wireless power receiver comprises a resonant frequency of a reference wireless power transmitter when loaded with the wireless power receiver.

16. The controller of claim 15, wherein the comparison is performed taking into account the parameter stored by the wireless power transmitter.

17. The controller of claim 16, wherein the parameter stored by the wireless power transmitter comprises one or more of:
a Q-factor of the wireless power transmitter when the wireless power transmitter is not loaded by a wireless power receiver;
a Q-factor of a reference wireless power transmitter when the wireless power transmitter is not loaded by a wireless power receiver; and
a ratio of an inductance of the reference wireless power transmitter not loaded with a wireless power transmitter to an inductance of the reference wireless power transmitter loaded with a wireless power receiver.

18. The controller of claim 17, wherein the inductance of the reference wireless power transmitter loaded with a wireless power receiver is an average of inductance values exhibited with more than two types of wireless power receivers.

19. The controller of claim 15, wherein the comparison is performed taking into account the parameter received from the wireless power receiver.

20. The controller of claim 19, wherein the parameter received from the wireless power receiver comprises a resonant frequency of a reference wireless power transmitter when loaded with the wireless power receiver.

21. The controller of claim 20, wherein the comparison is further performed taking into account the parameter stored by the wireless power transmitter, wherein the parameter stored by the wireless power transmitter comprises a resonant frequency of the reference wireless power transmitter when it is not loaded with a wireless power receiver.

22. The controller of claim 21, wherein the parameter stored by the wireless power transmitter further comprises one or more of:
a Q-factor of the wireless power transmitter when the wireless power transmitter is not loaded by a wireless power receiver; and
a Q-factor of a reference wireless power transmitter when the wireless power transmitter is not loaded by a wireless power receiver.

23. The controller of claim 20, wherein the comparison is further performed taking into account the parameter stored by the wireless power transmitter, wherein the parameter stored by the wireless power transmitter comprises one or more of:
a Q-factor of a reference wireless power transmitter when the wireless power transmitter is not loaded by a wireless power receiver; and
a resonant frequency of the wireless power transmitter when terminated with a resonant capacitance and wireless power transmitter is not loaded by a wireless power receiver.

24. The controller of claim 23, wherein the parameter further comprises a resonant frequency of the reference wireless power transmitter when it is not loaded with a wireless power receiver.

25. The controller of claim 15, wherein the circuitry is configured to allow or disallow wireless power transfer or adjust transferred power level, or communicate with the wireless power receiver, based on whether a foreign object is determined to be present.

26. The controller of claim 15, wherein the circuitry is configured to:

prior to the determining, evaluate the Q-factor measurement to determine whether the wireless power receiver is present.

27. The controller of claim 15, wherein the Q-factor measurement is performed in part by taking into account measured resonance frequency of the wireless power transmitter.

28. The controller of claim 25, wherein the circuitry is configured to:
when the wireless power receiver is determined to be present, increasing a strength of a field produced by the wireless power transmitter prior to receiving the reference Q-factor from the wireless power receiver.

29. A wireless power transmitter, comprising:
a controller configured to:
measure Q-factor of a system including a wireless power transmitter and a wireless power receiver to produce a Q-factor measurement;
receive a reference Q-factor of the wireless power receiver; and
determine whether a foreign object is present by a comparison of the reference Q-factor and the Q-factor measurement, wherein the comparison is performed taking into account one or more of:
a parameter stored by the wireless power transmitter, wherein the parameter stored by the wireless power transmitter comprises one or more of: a Q-factor of the wireless power transmitter when the wireless power transmitter is not loaded by a wireless power receiver; a Q-factor of a reference wireless power transmitter when the reference wireless power transmitter is not loaded by a wireless power receiver; and a ratio of an inductance of the reference wireless power transmitter not loaded with a wireless power receiver to an inductance of the reference wireless power transmitter loaded with a wireless power receiver; and
a parameter received from the wireless power receiver, wherein the parameter received from the wireless power receiver comprises a resonant frequency of a reference wireless power transmitter when loaded with the wireless power receiver.

\* \* \* \* \*